United States Patent
Bunch (10) Patent No.: US 7,817,078 B2
(45) Date of Patent: Oct. 19, 2010

(54) SYSTEMS AND METHODS FOR SUPPLEMENTAL WEATHER INFORMATION PRESENTATION ON A DISPLAY

(75) Inventor: Brian Bunch, Snohomish, WA (US)

(73) Assignee: Honeywell International Inc., Morristown, NJ (US)

(*) Notice: Subject to any disclaimer, the term of this patent is extended or adjusted under 35 U.S.C. 154(b) by 177 days.

(21) Appl. No.: 12/040,784

(22) Filed: Feb. 29, 2008

(65) Prior Publication Data

US 2009/0219197 A1    Sep. 3, 2009

(51) Int. Cl.
G01S 13/00    (2006.01)
(52) U.S. Cl. .................. 342/26 B; 342/176; 342/26 D
(58) Field of Classification Search .................. 340/945
See application file for complete search history.

(56) References Cited

U.S. PATENT DOCUMENTS

| | | | |
|---|---|---|---|
| 6,043,756 A * | 3/2000 | Bateman et al. ............. | 340/945 |
| 6,148,261 A | 11/2000 | Obradovich et al. | |
| 6,199,008 B1 | 3/2001 | Aratow et al. | |
| 6,381,528 B1 * | 4/2002 | Kawada et al. ................ | 701/41 |
| 6,441,773 B1 | 8/2002 | Kelly et al. | |
| 6,448,922 B1 * | 9/2002 | Kelly ....................... | 342/26 R |
| 6,501,392 B2 | 12/2002 | Gremmert et al. | |
| 6,549,161 B1 * | 4/2003 | Woodell ................... | 342/26 R |
| 6,633,801 B1 | 10/2003 | Durlacher et al. | |
| 6,650,972 B1 * | 11/2003 | Robinson et al. ............... | 701/3 |
| 6,657,578 B2 * | 12/2003 | Stayton et al. ................ | 342/30 |
| 6,828,922 B1 * | 12/2004 | Gremmert et al. ........... | 340/949 |
| 7,027,898 B1 | 4/2006 | Leger et al. | |
| 2002/0039070 A1 | 4/2002 | Ververs et al. | |
| 2002/0039072 A1 | 4/2002 | Gremmert et al. | |
| 2004/0183695 A1 | 9/2004 | Ruokangas et al. | |
| 2006/0129286 A1 | 6/2006 | King | |
| 2007/0150124 A1 * | 6/2007 | Wipplinger et al. ............ | 701/3 |
| 2008/0165051 A1 * | 7/2008 | Khatwa .................... | 342/26 B |

FOREIGN PATENT DOCUMENTS

WO    99040457 A1    8/1999

OTHER PUBLICATIONS

Velotas et al., Turbulence Auto-PIREP System (TAPS) An Overview, AeroTech Research (U.S.A.), Inc., Jun. 9, 2005.
Robinson et al., Using Airborne Turbulence Detection & Reporting Technologies to Increase Airspace Utilization, The Application of Aviation Safety Technologies to Airspace Management, AeroTech Research (U.S.A.), Inc., Jul. 2005.
Turbulence Auto-PIREP System (TAPS), AeroTech Research (U.S.A.), Inc., 2008.

* cited by examiner

*Primary Examiner*—Thomas H Tarcza
*Assistant Examiner*—Timothy A Brainard
(74) *Attorney, Agent, or Firm*—Black Lowe & Graham PLLC (57) ABSTRACT

An embodiment of the supplemental weather display system presents supplemental weather information on a display in a craft. An exemplary embodiment receives the supplemental weather information from a remote source, determines a location of the supplemental weather information relative to the craft, receives weather information from an on-board radar system, and integrates the supplemental weather information with the weather information received from the on-board radar system.

19 Claims, 5 Drawing Sheets

| | Preamble | 1 | 2 | 3 | 4 | | 20 | | 511 | 512 |
|---|---|---|---|---|---|---|---|---|---|---|
| $i$ | $P_i$ | 1 | 2 | 3 | 4 | ... | 20 | ... | 511 | 512 |
| $i+1$ | $P_{i+1}$ | 1 | 2 | 3 | 4 | ... | 20 | ... | 511 | 512 |
| ⋮ | 402 | | | | | | | | | |

SYSTEMS AND METHODS FOR SUPPLEMENTAL WEATHER INFORMATION PRESENTATION ON A DISPLAY

GOVERNMENT INTEREST

The invention described herein was made in the performance of work under NASA Contract No. NNL06AA22C (Subcontract No. 07-002 and is subject to the provisions of Section 305 of the National Aeronautics and Space Act of 1958 (42 U.S.C. 2457). The Government may have rights to portions of this invention.

BACKGROUND OF THE INVENTION

Commercial aircraft employ on-board weather radio detection and ranging (RADAR, or commonly referred to as "radar") systems that detect weather phenomena and display such detected weather phenomena on a radar display. Existing on-board weather radar systems provide data on weather local to the aircraft, for example, weather ahead of the aircraft within the range of the weather radar unit. The weather information is displayed on a cockpit weather display. However, the weather data collected by an aircraft is available only to the particular aircraft experiencing the weather since the weather phenomena is detected by the on-board radar system. That is, weather information displayed on on-board cockpit radar displays is limited to the weather returns supplied by the on-board weather radar.

Various techniques have been proposed to provide an aircraft weather information system wherein the weather information is provided to the aircraft from various sources external to the aircraft. For example, the commonly assigned U.S. patent application Ser. No. 09/907,730, published as U.S. 2002/0379072, entitled "AIRCRAFT WEATHER INFORMATION SYSTEM", and the commonly assigned U.S. Pat. No. 8,829,922, issued on Dec. 7, 2004, entitled "SYNTHETIC AIRBORNE HAZARD DISPLAY", both of which are incorporated herein by reference, propose providing weather related information detected by other aircraft and/or ground installations to the aircraft. Such supplemental information enhances the quality of weather information presented on the on-board cockpit radar displays.

Such supplemental weather information may be particularly beneficial if the weather information related to weather phenomena not readily detectable by the on-board radar system, such as turbulence. For example, a remote aircraft may pass through a region of turbulence that is not identified by the radar system. Acceleration sensors or motion sensors may identify the turbulence.

Information corresponding to the detected turbulence is communicated to a ground station or to other aircraft using a pilot report (PIREP). Pilots of other aircraft may learn of the turbulence from the PIREP.

However, legacy on-board radar systems cannot receive and display such supplemental weather information and present such on their on-board cockpit radar displays because they are not configured to receive and interpret PIREPs. To take advantage of such supplemental weather information, the legacy on-board radar system must be removed and replaced with a new on-board radar system having the capacity to receive and display such supplemental weather information. Refitting an aircraft with a new on-board radar system is very expensive and time consuming. Accordingly, it is desirable to provide legacy on-board radar systems with the ability to receive and present supplemental weather information on their on-board cockpit radar displays.

Further, aircraft personnel may use various types of portable auxiliary equipment. Such equipment may be commonly referred to as an "electronic flight bag" (EFB) or an "electronic travel bag" (ETB), generally referred to as EFBs herein. EFBs are connectable to aviation electronics of the airplane via ports, busses, or other suitable connectors. Some EFBs may include a display. At times, it may be desirable to have the EFB display present the supplemental weather information on its radar display.

SUMMARY OF THE INVENTION

Systems and methods of displaying supplemental weather information and weather detected by a radar system are disclosed. An exemplary embodiment has an input interface communicatively coupled to the radar system and operable to receive the detected weather information from the radar system, and communicatively coupled to a communication management unit that receives the supplemental weather information from a source that is remote to a craft; a processor system communicatively coupled to the input interface, and operable to integrate the weather information and the supplemental weather information, and a display communicatively coupled to the processor system and operable to display the integrated weather phenomena and supplemental weather information.

In accordance with further aspects, an exemplary embodiment is a system that has a radar system operable to detect weather phenomena in a vicinity of a craft and operable to generate weather information corresponding to the detected weather phenomena; a transceiver operable to receive supplemental weather information from a remote source; a processor system communicatively coupled to the radar system and the transceiver, and operable to integrate the weather information and the supplemental weather information; and a display communicatively coupled to the processor system and operable to display the integrated weather information and supplemental weather information.

In accordance with further aspects, an exemplary embodiment is a process that receives the supplemental weather information from a remote source, determines a location of the supplemental weather information relative to the craft, receives weather information from an on-board radar system, and integrates the supplemental weather information with the weather information received from the on-board radar system.

BRIEF DESCRIPTION OF THE DRAWINGS

Preferred and alternative embodiments are described in detail below with reference to the following drawings.

DETAILED DESCRIPTION OF THE PREFERRED EMBODIMENT

Figure 1:
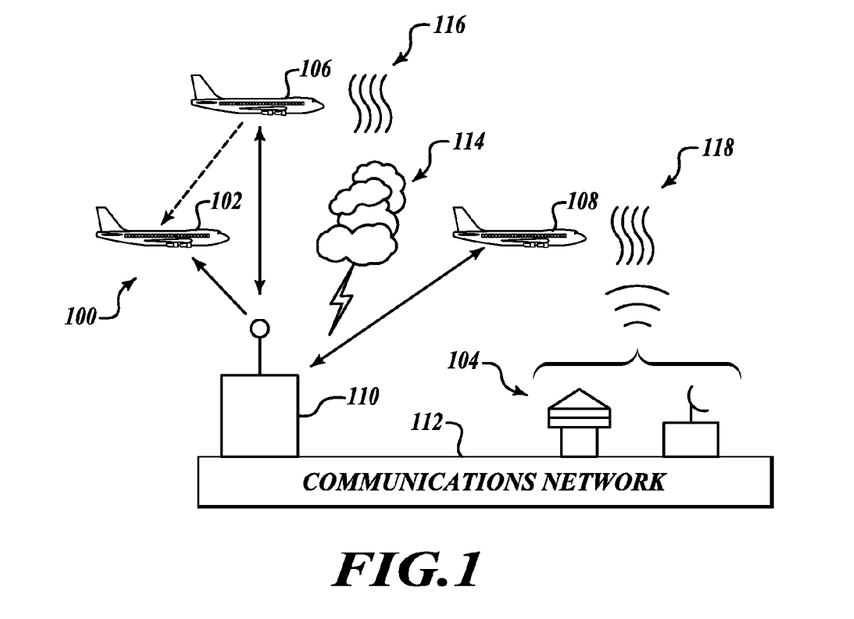
FIG. 1 is a conceptual illustration of aircraft receiving and communicating weather-related information.
Figure 2:
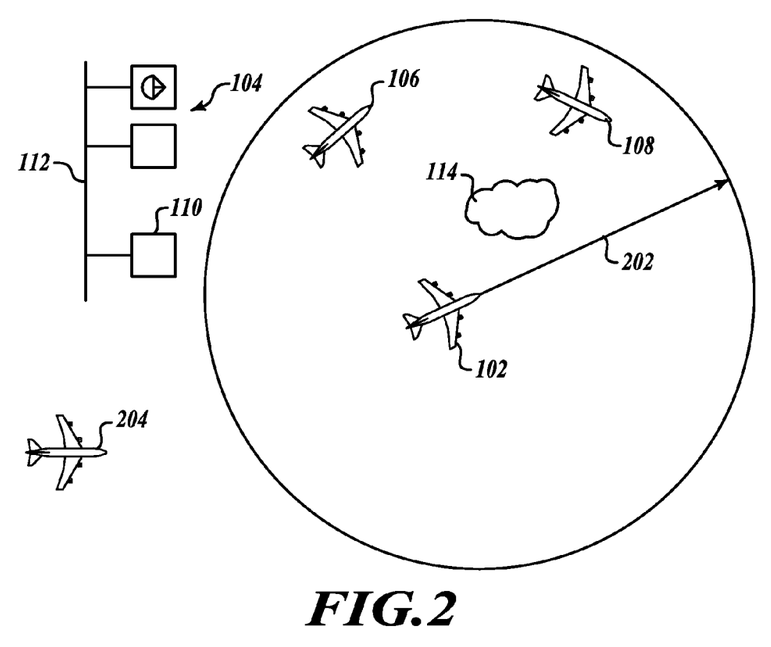
FIG. 2 is a conceptual illustration of the aircraft of FIG. 1 from a top view perspective.

FIG. 1 is a conceptual illustration of aircraft receiving and communicating weather-related information. An aircraft 102 is equipped with an embodiment of a supplemental weather display system 100. FIG. 2 is a conceptual illustration of the aircraft 102 of FIG. 1 from a top view perspective.

Weather data is collected from a plurality of sources. These sources may be terrestrial weather instrumentation 104 equipped with terrestrial sensors that may include weather radar, local observations and other Earth-based sensors commonly known to those of skill in the art. Weather data may also be collected by a plurality of aircraft 106, 108. The data collected from aircraft 106, 108 is preferably collected by using standard instrumentation already carried aboard the aircraft 106, 108. This standard instrumentation typically includes, but is not limited to: a weather radar, a storm scope, navigation systems, motion sensors, and/or an air data computer. The type of weather data available can include, depending upon sensor availability, the following:

(a) Convective activity (e.g., from Doppler radar measurements);
(b) Turbulence (e.g., from Doppler radar measurement/down linked acceleration data from aircraft 106, 108);
(c) Winds aloft (e.g., from down linked data from other aircraft or ground stations);
(d) High surface winds (e.g., from local measurements);
(e) Icing conditions (e.g., from down linked data and/or infra red measurements);
(f) Precipitation density (e.g., from ground and airborne radar reflectivity data);
(g) Lightning (e.g., from Storm Scope or other sensor);
(h) Cloud density (e.g., from satellite imagery); and
(i) Volcanic Ash (e.g., from satellite imagery).

A ground station 110 receives the weather data via downlink and/or via communications backbone 112. Ground station 110 may also incorporate into the compiled data any available turbulence and pilot reports (PIREPS), referred to herein as TAPS information, from aircraft 106, 108. The ground station 110 then processes the available weather data for uplink to the aircraft 102 equipped with an embodiment of the supplemental weather display system 100.

Some embodiments are operable to receive supplemental weather information directly from other aircraft. Other embodiments are operable to receive supplemental weather information from on-board detection systems, such as, but not limited to, a lightning detection system.

The supplemental weather information received by the aircraft 102 is then processed for display on a cockpit display. The various threat conditions are communicated to the pilot by drawing icons on the display, such as patterned polygons, for example. Thus, the pilot sees a series of two-dimensional figures in a plan view so the pilot can easily see the relationship of his short-term flight path to nearby meteorological threats.

Some types of weather phenomena are detectable by the aircraft 102 equipped with an on-board radar system (not shown). For example, a thunderstorm 114 is the type of weather phenomena detectable by a weather radar system. FIG. 2 conceptually illustrates the range 202 of the on-board weather radar system of aircraft 102. Since the thunderstorm 114 is within the range 202 of the on-board weather radar system, the radar display would indicate the presence and/or severity of the thunderstorm 114.

Some types of weather phenomena are not detectable (or at least not detectable with suitable reliability) by the on-board weather radar system of the aircraft 102. One exemplary type of such weather phenomena is turbulence. However, turbulence is detectable by an aircraft passing through such turbulence. For example, the aircraft 106 is illustrated as passing through turbulence 116. Sensors on the aircraft 106 detect the turbulence 116. Information corresponding to the detected turbulence 116 is communicated to the ground station 110. Similarly, the aircraft 108 is passing through the turbulence 118. Sensors on the aircraft 108 detect the turbulence 118. Information corresponding to the detected turbulence 118 is communicated to the ground station 110. Alternatively, or in addition to, the terrestrial weather instrumentation 104 may detect the turbulence 118 and communicate information corresponding to the detected turbulence 118 to the ground station 110.

With respect to FIG. 2, the aircraft 106 and the aircraft 108 are within the range 202 of the on-board radar system of the aircraft 102. Embodiments of the supplemental weather display system 100 receive information corresponding to supplemental weather information, such as, but not limited to, the turbulence 116 and the turbulence 118. The supplemental weather information is presented on the on-board cockpit radar display of the aircraft 102 using suitable icons or the like. The supplemental weather information may be received from the ground station 110, or, from the aircraft 106 and/or the aircraft 108.

It is appreciated that aircraft 204 is outside of the radar range 202 of aircraft 102. Accordingly, any supplemental weather information provided by the aircraft 204 will not be relevant to the pilots of aircraft 102. Accordingly, weather information from the aircraft 204 would not by displayed on the on-board cockpit radar display of aircraft 102. Embodiments of the supplemental weather display system 100 may be installed on any craft equipped with a weather radar system, such as an aircraft, boat, submarine, dirigible, automobile, or vehicle.

Figure 3:
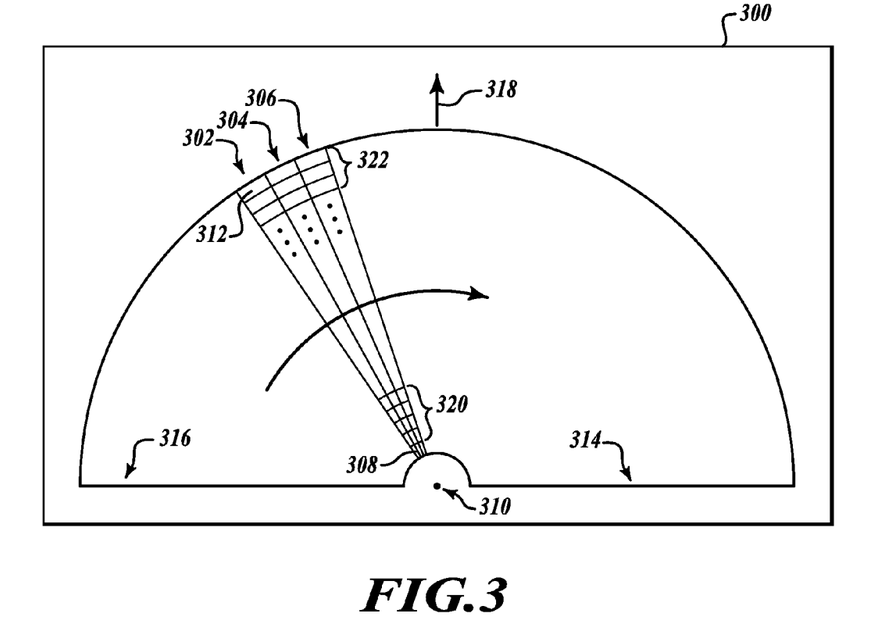
FIG. 3 is a conceptual illustration of data corresponding to three radials of ARINC 453 data presented on a radar display.

FIG. 3 is a conceptual illustration of data corresponding to three radials 302, 304, and 306 of ARINC 453 data presented on a radar display 300. As noted above, the radar data is processed into a series of color information assigned to bins of a radial. As the radials are presented in a serial manner moving across the display 300, the viewer perceives a sweeping-like presentation of the radar information as the radials are serially presented.

For example, as radial 302 is presented, a first bin 308 with a first color is visible at or near the origin 310. Colors are presented out along the radial up to the last bin 312. As noted above, colors are indicative of the nature (e.g., severity) of the detected weather phenomena and/or other physical objects. For example, the color black indicates an absence of weather phenomena (no returning reflected radar signal at that range). Other colors used are red, orange, blue and magenta. The colors presented in a radar image normally range from blue or green for weak returns, to red or magenta for very strong returns. Strong returns (red or magenta) may be indicative of heavy rain, thunderstorms, hail, strong winds, or tornadoes, however such information needs to be interpreted carefully.

Following presentation of the radial 302, the radial 304 is next presented, followed by the radial 306. Presentation of the radials continues until the last radial is presented at the end 314 of the radar display 300. Presentation of the radials then begins at the beginning 316 of the radar display 300, and continues across the screen. Since the currently presented radial corresponds to a more recent acquisition of radar data than the preceding presented radials, the radar display 300 is refreshed with the most currently available radar information.

Further, since the location of a bin along any particular radial corresponds to proximity to the detecting radar system 300, the viewer understands that the presented data corresponding to the group of bins 320 corresponds to the detection of reflecting weather phenomena (and/or other physical objects) relatively close to the detecting radar system 300, and that the last of the bins 322 corresponds to the detection of reflecting weather phenomena (and/or other physical objects) relatively far away from the detecting radar system 300.

It is appreciated that the illustrated radar display 300 displays across a range of approximately 180°, with the arrow 318 corresponding to the front of the airplane in which the radar display 300 is installed. Other radar information presentation formats may be used, such as a 360° presentation wherein radar information surrounding the detecting radar system is displayed. Embodiments of the supplemental weather display system 100 may be operable with any suitable radar device or system.

Figure 4:
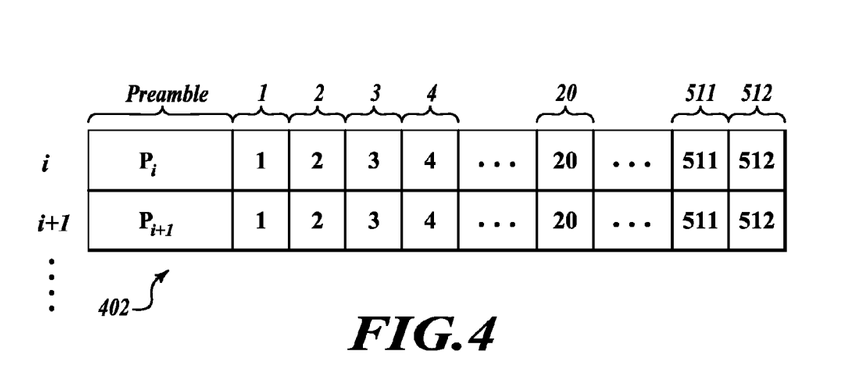
FIG. 4 is a conceptual illustration of radar data generated under the ARINC 453 format.

FIG. 4 is a conceptual illustration of radar data 402 generated under the ARINC 453 format. Each radial i resides in a 1600 bit word that begins with a 64 bit header (Pi) followed by a series of 512 sub-words (3 bits each). The header (Pi) contains various presentation information pertaining to the radial, such as the angular orientation of the header on the radar display 300. For example, the header (Pi) may contain a specified angle at which the corresponding radial is to be presented on the radar display 300.

In the simplified example of FIG. 3, the location of the 3 bit sub-words in the word corresponds to the location along the radial i. For example, the first sub-word (indicated as "1") contains the information that corresponds to presented first bin 308 (FIG. 3). The sub-words indicated as "1", "2", "3" and "4" in FIG. 5 correspond to the first four presented bins 320 (FIG. 3). The last sub-word 512 corresponds to the last presented bin 312 (FIG. 3).

Further, the 3 bit sub-words contain color information corresponding to the characteristics of detected reflecting weather phenomena (and/or other physical objects). For example, a number in a bin may correspond to the color black to indicate that, for that range bin, no reflections from weather phenomena (and/or other physical objects) were detected.

It is appreciated that other suitable information formats may be received and processed by various embodiments of the supplemental weather display system 100. A different number of range bins may be used, for example. Further, additional or alternative colors may be used. Some radar systems 300 may use only black and white colors.

Figure 5:
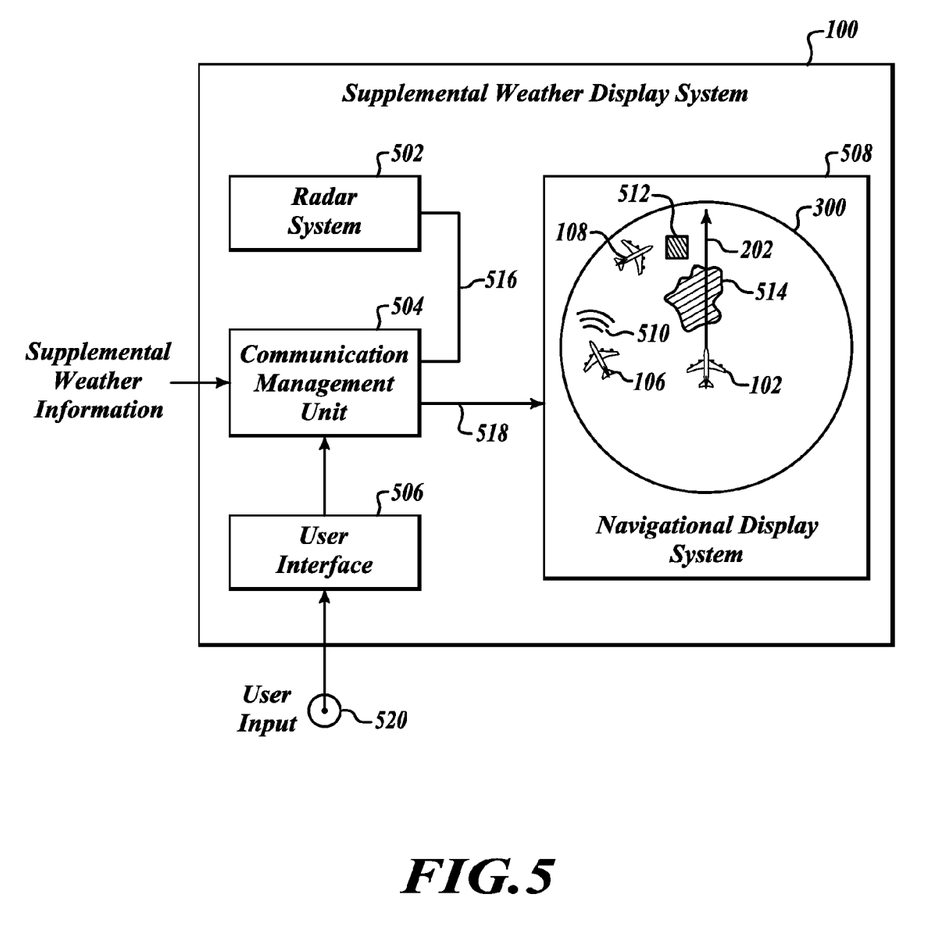
FIG. 5 is a block diagram of a supplemental weather display system embodiment.
Figure 6:
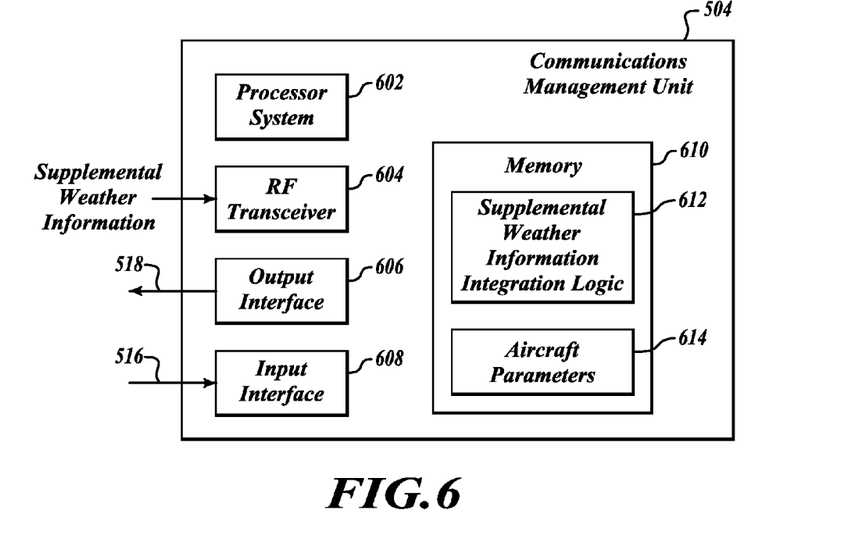
FIG. 6 is a block diagram of a communication management unit in the supplemental weather display system embodiment.

FIG. 5 is a block diagram of an exemplary embodiment of the supplemental weather display system 100. The exemplary supplemental weather display system 100 comprises a radar system 502, a communication management unit 504, a user interface 506, and a navigational display system 508. FIG. 6 is a block diagram of the communication management unit 504 in the supplemental weather display system 100 of FIG. 4. The communication management unit 504 comprises a processor system 602, a radio frequency (RF) transceiver 604, an output interface 606, and input interface 608, and a memory 610. The memory 610 includes a portion for the supplemental weather integration logic 612 and a portion for the aircraft parameters 614. In some embodiments, the weather integration logic 612 and the aircraft parameters 614 may be stored in separate memories.

In the illustrated exemplary embodiment of the supplemental weather display system 100, the radar system 502 communicates supplemental weather information corresponding to detected weather phenomena to the communication management unit 504, via connector 516. The weather information is received by the input interface 608. In an exemplary embodiment, input interface 608 is operable to receive the radar information in the ARINC 453 format from the radar system 502. Other embodiments communicate the radar information in other formats.

As noted above, the aircraft 106 detected the turbulence 116. Similarly, the aircraft 108 detected the turbulence 118 (FIG. 1). Further, the on-board radar system 502 detected the thunderstorm 114. The supplemental weather information is communicated from the aircraft 106 and the aircraft 108 to the ground station 110. After processing, the ground station 110 communicates a RF signal with the supplemental weather information to aircraft 102 equipped with an embodiment of the supplemental weather display system 100. (Alternatively, or additionally, the aircraft 106 and the aircraft 108 may directly communicate their supplemental weather information directly to aircraft 102.) The supplemental weather information is received by the RF transceiver 604 of the communications management unit 504. In alternative embodiments, other suitable RF receiving devices may be used.

The supplemental weather information is received as an RF signal by RF transceiver 604. The processor system 602 retrieves and executes the supplemental weather integration logic 612 from memory 610 to integrate the supplemental weather information of the supplemental weather information signal with the weather information from the radar system 502. The integrated display information is communicated to display 300 via connector 518.

The received supplemental weather information and the weather information from the radar system 502 are integrated together into a single display presentation such that the viewer of display 300 views the received supplemental weather information and the detected weather information. The supplemental weather information may be indicated using an icon that is recognizable to the viewer. For example, an icon 510 is presented on display 300 which indicates the presence of the turbulence 116 detected by the aircraft 106. A second icon 512 is presented on the display 300, which indicates the presence of the turbulence 118 detected by the aircraft 108. The detected thunderstorm 114 is indicated by an icon 514.

To integrate the received supplemental weather information and the information from radar system 502, the communication management unit 504 identifies which supplemental weather information, such as turbulence, is to be presented on display 300. The communication management unit 504 identifies which of the supplemental weather information is within the display range of the display 300. Weather information outside the display range may be deleted, ignored, deselected, etc. Weather information within the display range is further processed to determine if it should be integrated with the weather information from the radar system 502.

The supplemental weather display system 100 correlates the location of the supplemental weather information within the display range with respect to the location of the aircraft 102. Accordingly, embodiments of the supplemental weather display system 100 determine where the icons corresponding to the supplemental weather information are to be displayed on the display 300. The supplemental weather information is then integrated with the weather information from the radar system 502 such that the integrated display information is generated.

The integrated display information is communicated to the display 300 via the output interface 606. The integrated display information may be output in any suitable format. In one embodiment, the integrated display information is in the ARINC 453 data format. In another embodiment, described in greater detail below, the integrated display information is processed into a low bandwidth format, such as, but not limited to, an ARINC 429 data format.

In the example above, the location of the aircraft 106 is known (location of the aircraft 106 is specified by information in its TAPS, or the location is determined by ground-based radar). Accordingly, the location of the turbulence 116 is determinable. Since the location of the aircraft 102 is known to itself, the supplemental weather display system 100 determines the location of the detected turbulence 116 with respect to the current aircraft location. Upon determining the relative location of the turbulence 116, the supplemental weather display system 100 then determines the location on the display 300 where the icon 510 is to be displayed so as to indicate to a viewer the location of the turbulence 116 with respect to the aircraft 102.

In one embodiment, the weather information from the radar system 502 is an ARINC 453 compliant signal. Accordingly, the communication management unit 504 determines which ranges and bins correspond to the determined location of the supplemental weather information that is to be integrated with the detected weather information provided by the radar system 502. The communication management unit 504 then processes the bin information and provides information that corresponds to the icon representative of the supplemental weather information that is to be displayed on the display 300. For example, the bid data may be replaced, substituted, or the like, with data corresponding to the icon representative of the supplemental weather information.

In some embodiments, the user interface 506 is operable to receive input from a user such that the supplemental weather information is integrated with the weather information from the radar system 502 on a selectable basis. For example, an actuator 520 or the like communicates a user input signal to the user interface 506 which indicates that the supplemental weather information is to be integrated with the weather information from the radar system 502. The user input signal from the actuator 520 may be modified by the user such that the supplemental weather information is not integrated with the weather information from the radar system 502. Thus, the user may choose to have the supplemental weather display system 100 integrate, or not integrate, the supplemental weather information with the weather information from the radar system 502.

In some embodiments, the actuator 520 may be operable to select the types of supplemental weather information to be integrated with the weather information from the radar system 502. For example, the user may desire to integrate turbulence information with the weather information from the radar system 502. Actuator 520 generates a signal that indicates that the turbulence information is to be selected from the received supplemental weather information. In some embodiments, a plurality of types of supplemental weather information may be selected for integration with the weather information from the radar system 502.

Examples of actuator 520 include, but are not limited to, a push-button, a toggle-switch, a multi-position sensing device configured to sense a plurality of switch positions, a touch sensitive device, or a light sensitive device. Furthermore, the functionality of the actuator 520 may be alternatively implemented as a menu displayed on a display, such as display 300. In some embodiments, the actuator 520 is a component of the communication management unit 504. If implemented on a menu-based system, a cursor, touch sensitive button, or the like, may be displayed on the display 300 for activating a user interface menu which displays selectable types of, or characteristics of, available supplemental weather information that is displayable on the display 300.

Some embodiments of the supplemental weather display system 100 are operable to analyze the received supplemental weather information to determine if the supplemental weather information should be presented. Preferably, one or more characteristics of the supplemental weather information is correlated with one or more characteristics of the aircraft 102. Characteristics of the aircraft 102 may be stored in the aircraft parameters 614 portion of memory 610.

In an exemplary embodiment, the supplemental weather display system 100 determines if the supplemental weather information will impact performance of the aircraft 102. In response to determining that the supplemental weather information will impact performance of the aircraft, the supplemental weather information is integrated with the weather information received from the on-board radar system 502.

For example, the size of the aircraft 102 may be larger than the size of the aircraft providing reporting of turbulence. To the relatively smaller aircraft detecting and reporting the turbulence, the turbulence may be significant. Presumably, the TAPS information from the relatively small aircraft includes information characterizing the strength of the turbulence and characteristics regarding the detecting aircraft. The supplemental weather display system 100 correlates the reported turbulence strength information with the size of the aircraft 102 to determine if the reported turbulence is likely to have a significant effect on the aircraft 102. If the reported turbulence will not likely affect the aircraft 102, for example when the aircraft 102 is significantly larger than the aircraft reporting the turbulence, the supplemental weather display system 100 may determine that the reported turbulence information should not be integrated with the weather information from the radar system 502. On the other hand, if the reported turbulence will likely affect the aircraft 102 (such as when the aircraft 102 is the same size or smaller than the aircraft reporting the turbulence), the supplemental weather display system 100 may determine that the reported turbulence information should be integrated with the weather information from the radar system 502.

Other relevant characteristics of the supplemental weather information may include altitude. For example, the supplemental weather display system 100 correlates the reported turbulence altitude with the altitude of the aircraft 102 to determine if the reported turbulence will have any significant effect on the aircraft 102. If the altitude of the reported turbulence is within a threshold of the altitude of the aircraft 102, the supplemental weather display system 100 may determine that the reported turbulence information should be integrated with the weather information from the radar system 502. On the other hand, if the altitude of the reported turbulence is outside of the threshold, the supplemental weather display system 100 may determine that the reported turbulence information should not be integrated with the weather information from the radar system 502 (since the aircraft 102 is not likely to encounter the turbulence in view of the altitude differences)

Location of the reported supplemental weather information may also be an analyzed characteristic. The current heading, and/or a future heading, of the aircraft 102 may be correlated with the respective location of the supplemental weather information. If the aircraft 102 is traveling at a heading where the supplemental weather information is likely not to be encountered, the supplemental weather display system 100 may determine that the reported turbulence information should not be integrated with the weather information from the radar system 502. Accordingly, information that is not relevant to the immediate needs of the pilot is not presented on display 300.

Figure 7:
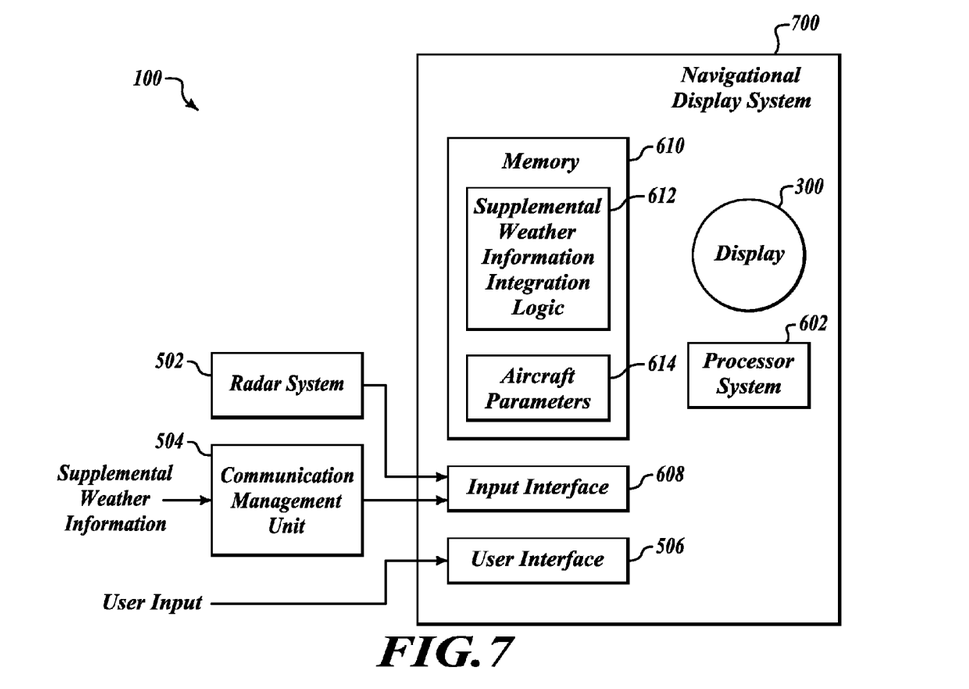
FIGS. 7 and 8 are block diagrams of alternative embodiments of the supplemental weather display system.

FIG. 7 is a block diagram of an alternative embodiment of the supplemental weather display system 100 implemented in a navigational display system 700. In this alternative embodiment, the user interface 506, the processor system 602, the input interface 608, and the memory 610 are included in the navigational display system 508. The memory 610 includes a portion for the supplemental weather integration logic 612 and an optional portion for the aircraft parameters 614. This embodiment allows a navigation display system 700 to be communicatively coupled to the radar system 502 and the communication management unit 504. The radar system 502 and the communication management unit 504 may be a legacy device installed in an existing aircraft. Accordingly, the aircraft 102 may be upgraded to have an embodiment of the supplemental weather display system 100 by replacing the legacy navigation display system 508 (FIG. 5) with the navigation display system 700.

Figure 8:
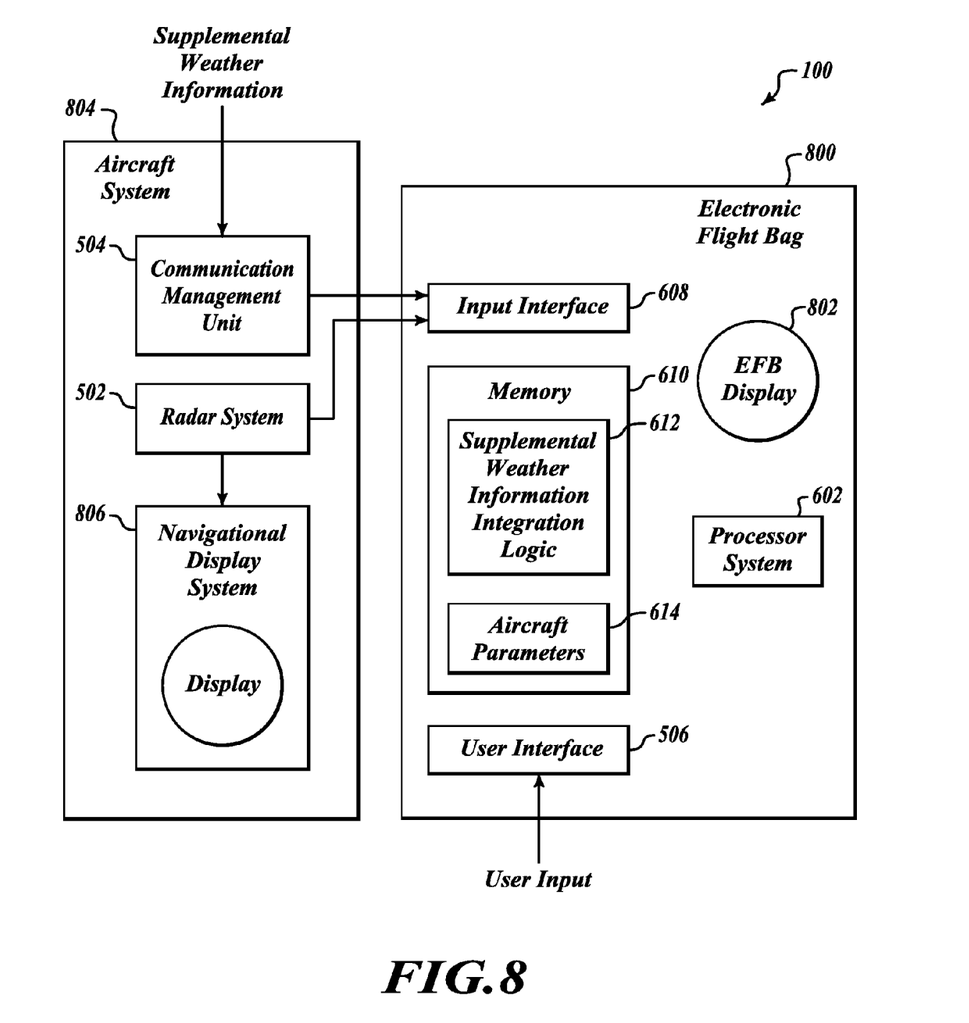

FIG. 8 is a block diagram of an alternative embodiment of the supplemental weather display system 100. Aircraft personnel may use various types of portable auxiliary equipment implemented with an embodiment of the supplemental weather display system 100. Such equipment may be commonly referred to as an "electronic flight bag" (EFB) or an "electronic travel bag" (ETB), generally referred to as an EFB 800 herein.

An EFB 800 is connectable to aviation electronics of the airplane via ports, busses, or other suitable connectors. In some embodiments, the EFB 800 conforms its connection to communicate under the ARINC 429 standard, which is a relative low speed data protocol (particularly with respect to the ARINC 453 standard used by radars). ARINC 429 supports a low speed mode (12.5 to 14.5 kHz), or a high speed mode (100 kHz), data transfers based upon a 32 bit word structure.

The EFB 800 may include a display 802. At times, it may be desirable to have the EFB display 802 present radar information integrated with supplemental weather information. Accordingly, the EFB 800 includes the user interface 506, the processor system 602, the input interface 608, and the memory 610. The memory 610 includes a portion for the supplemental weather integration logic 612 and an optional portion for the aircraft parameters 614. This embodiment allows the EFB 800 with an embodiment of the supplemental weather display system 100 to be communicatively coupled to the radar system 502 and the communication management unit 504. The radar system 502 and the communication management unit 504 may be legacy devices installed in an existing aircraft system 806. Thus, the radar system 502 remains coupled to the legacy navigational display system 508.

In the various embodiments of the supplemental weather display system 100, processing time for the supplemental weather display system 100 to integrate the supplemental weather information with the weather information from the radar system 502 is preferably short enough so as not to cause a substantial delay in the refresh rate of the weather information from the radar system 502. That is, the time for integration of the selected supplemental weather display system 100 is preferably less than the update rate of the display 300.

Embodiments may use one or more suitable icons to present a particular type of supplemental weather information. One embodiment may employ a rectangle that may have a particular hatching style, shading, and/or color to indicate characteristics of the integrated supplemental weather information. Another embodiment may use a series of arcs, bars or lines to display the supplemental weather information. Further, characteristics of the displayed icon may indicate characteristics of the supplemental weather information. For example, the color and/or intensity of the displayed icon may indicate severity of the turbulence.

Some embodiments may display supplemental textual information corresponding to characteristics of the supplemental weather information with the displayed icon. For example, alpha-numeric text may indicate the altitude of the displayed supplemental weather information.

Some embodiments are operable to allow a user to specify characteristics of the icon used to indicate the presence of the supplemental weather information. For example, the pilot may desire a relatively large and/or brightly colored icon that is easily discernable. Alternatively, a navigator may prefer a smaller, less noticeable icon. Thus, the actuator 616 is configured to allow the user to specify attributes of the displayed icon.

The processor system 602 is typically a commercially available processor. Examples of commercially available processors include, but are not limited to, an 80×86 or Pentium series microprocessor from Intel Corporation, U.S.A., a PowerPC microprocessor from IBM., a Sparc microprocessor from Sun Microsystems, Inc., a PA-RISC series microprocessor from Hewlett-Packard Company, or a 68xxx series microprocessor from Motorola Corporation. The processor system 602 controls the execution of a program, employed by embodiments of the supplemental weather display system 100. Furthermore, for convenience of illustration in FIG. 3, the processor system 602, the memory 610, the supplemental weather integration logic 612, and the aircraft parameters 614 are shown residing in the communication management unit 504. The processor system 602, the memory 610, the supplemental weather integration logic 612, and/or the aircraft parameters 614 may reside in alternative convenient locations outside of the communication management unit 504, as components of other systems, or as stand alone dedicated elements, without adversely affecting the operation and functionality of the supplemental weather display system 100.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method for presenting supplemental weather information on a display in a craft, the method comprising:
   receiving, at the craft, the supplemental weather information from a remote source;
   determining, at the craft, a location of the supplemental weather information relative to the craft;
   receiving weather information from an on-board radar system residing on the craft; and
   integrating, at the craft, the supplemental weather information with the weather information received from the on-board radar system,
   wherein the characteristic of the supplemental weather information is an altitude of the supplemental weather information, wherein the characteristic of the craft is an altitude of the craft,
   wherein the supplemental weather information is integrated with the weather information received from the on-board radar system in response to determining that the altitude of the supplemental weather information is within a threshold of the altitude of the craft, and wherein the supplemental weather information is excluded from the weather information received from the on-board radar system in response to determining that the altitude of the supplemental weather information is outside of the threshold of the altitude of the craft.

2. The method of claim 1, wherein integrating the supplemental weather information comprises:

replacing a portion of the weather information received from the on-board radar system with a portion of an icon corresponding to the supplemental weather information.

3. The method of claim 2, wherein a location of the portion of the icon corresponds to the determined location of the supplemental weather information with respect to the craft.

4. The method of claim 2, further comprising:

displaying a portion of the icon and the weather information received from the on-board radar system on the display.

5. The method of claim 1, wherein the remote source is a ground station.

6. The method of claim 1, wherein the remote source is a remote aircraft.

7. The method of claim 1, further comprising:

determining if the supplemental weather information is within a range of the on-board radar system such that the supplemental weather information is integrated with the weather information when the supplemental weather information is within the range of the on-board radar system.

8. The method of claim 1, further comprising:

comparing at least one characteristic of the supplemental weather information with at least one characteristic of the craft;

determining if, based on the characteristic of the supplemental weather information, the supplemental weather information will impact performance of the craft; and integrating the supplemental weather information with the weather information received from the on-board radar system in response to determining that the supplemental weather information will impact performance of the craft.

9. The method of claim 8, wherein the supplemental weather information is turbulence detected by a remote aircraft, wherein a characteristic of the turbulence is a strength of the turbulence, and wherein the at least one characteristic of the craft is a weight of the craft.

10. The method of claim 1, wherein the threshold comprises an upper threshold and a lower threshold, and wherein the supplemental weather information is integrated with the weather information received from the on-board radar system in response to determining that the altitude of the supplemental weather information is between the upper threshold and the lower threshold.

11. A system residing on a craft for presenting supplemental weather information and detected weather phenomena, comprising:

an on-board radar system operable to detect weather phenomena in a vicinity of the craft and operable to generate weather information corresponding to the detected weather phenomena;

a transceiver residing on the craft, operable to receive the supplemental weather information from a remote source;

a processor system residing on the craft, communicatively coupled to the on-board radar system and the transceiver, and operable to integrate the weather information and the supplemental weather information; and a display residing on the craft, communicatively coupled to the processor system, and operable to display the integrated weather information and supplemental weather information, wherein the characteristic of the supplemental weather information is an altitude of the supplemental weather information, wherein the characteristic of the craft is an altitude of the craft, wherein the supplemental weather information is integrated with the weather information received from the on-board radar system in response to determining that the altitude of the supplemental weather information is within a threshold of the altitude of the craft, and wherein the supplemental weather information is excluded from the weather information received from the on-board radar system in response to determining that the altitude of the supplemental weather information is outside of the threshold of the altitude of the craft.

12. The system of claim 11, wherein the supplemental information is a turbulence and pilots report (TAPS) generated by a remote aircraft.

13. The system of claim 11, wherein the processor system is further operable to:

replace a portion of the weather information received from the radar system with a portion of an icon corresponding to the supplemental weather information, wherein a location of the portion of the icon corresponds to a determined location of the supplemental weather information with respect to the craft.

14. The system of claim 11, wherein the processor system is further operable to:

determine if the supplemental weather information is within a range of the on-board radar system such that the supplemental weather information is integrated with the weather information when the supplemental weather information is within the range of the on-board radar system.

15. The system of claim 11, wherein the processing system is further operable to:

compare at least one characteristic of the supplemental weather information with at least one characteristic of the craft;

determine if, based on the characteristic of the supplemental weather information, the supplemental weather information will impact performance of the craft; and integrate the supplemental weather information with the weather information received from the on-board radar system in response to determining that the supplemental weather information will impact performance of the craft.

16. An apparatus residing on a craft for presenting supplemental weather information and weather information detected by an on-board radar system, comprising:

an input interface residing on the craft communicatively coupled to the on-board radar system and operable to receive the detected weather information from the on-board radar system, and communicatively coupled to a communication management unit that receives the supplemental weather information from a source that is remote to the craft;

a processor system residing on the craft communicatively coupled to the input interface, and operable to integrate the weather information and the supplemental weather information; and a display residing on the craft communicatively coupled to the processor system and operable to display the integrated weather information and supplemental weather information, wherein the characteristic of the supplemental weather information is an altitude of the supplemental weather information, wherein the characteristic of the craft is an altitude of the craft, wherein the supplemental weather information is integrated with the weather information received from the on-board radar system in response to determining that the altitude of the supplemental weather information is within a threshold of the altitude of the craft, and wherein the supplemental weather information is excluded from the weather information received from the on-board radar system in response to determining that the altitude of the supplemental weather information is outside of the threshold of the altitude of the craft.

17. The apparatus of claim 16, further comprising:
a user interface communicatively coupled to the processor system and operable to receive a user selection to enable the integration of the weather information and the supplemental weather information.

18. The apparatus of claim 16, wherein the input interface, the processor system and the display reside in an electronic flight bag.

19. The apparatus of claim 16, wherein the input interface, the processor system and the display reside in a navigational display system.

* * * * *